Figure 1:
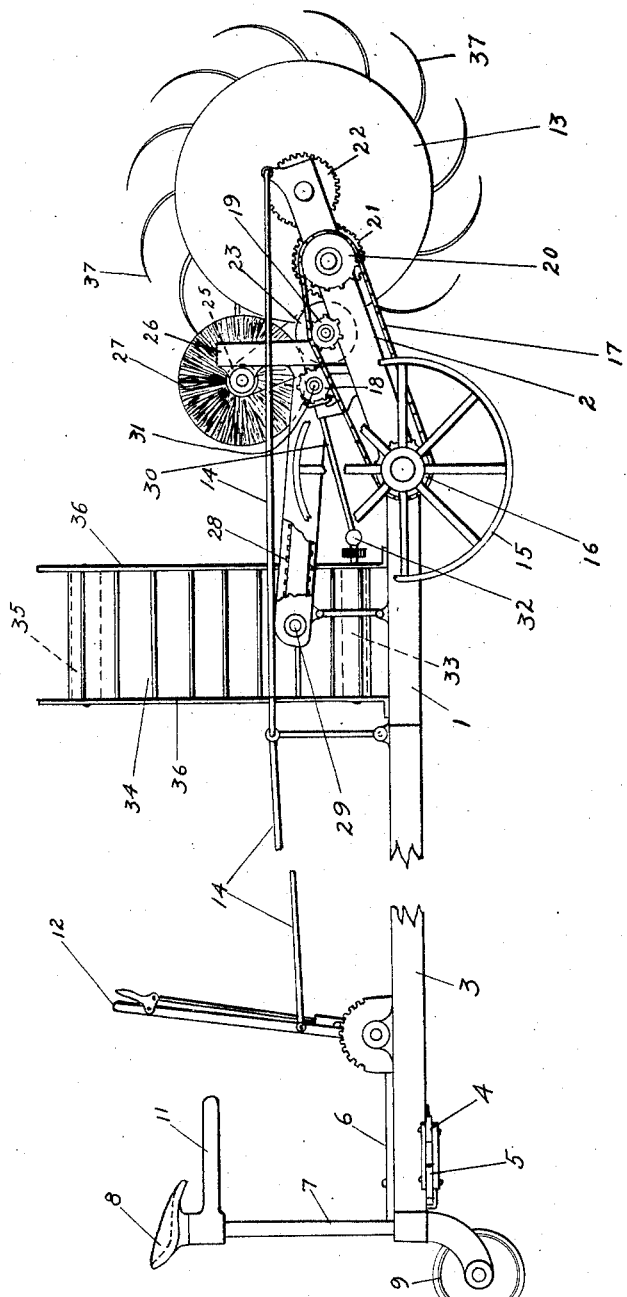

March 31, 1931.  V. E. HUNTER ET AL  1,798,883
COTTON HARVESTER
Filed Dec. 10, 1927   3 Sheets-Sheet 3

Victor E. Hunter
Frederick M Abernathy  Inventors
William H Gholson
By Charles W. Lovett
Attorney Patented Mar. 31, 1931

1,798,883

UNITED STATES PATENT OFFICE

VICTOR E. HUNTER, FREDERICK M. ABERNATHY, AND WILLIAM H. GHOLSON, OF ELK CITY, OKLAHOMA

COTTON HARVESTER

Application filed December 10, 1927. Serial No. 239,210.

Our invention relates to cotton harvesters. It has for its purposes to make possible the low unit cost of cotton production; to provide a machine adaptable to harvest cotton at greater speed and at less cost than has been heretofore possible; to materially reduce the ratio of picking cost to the selling price; to increase the resulting profits to the cotton farmer; to minimize the labor involved in cotton harvesting; to increase the efficiency of man power in cotton harvesting; to reduce the cost of cotton and cotton products; to make possible a lower cost harvester than has heretofore been available; to minimize the loss and waste of cotton in harvesting; to provide an improved form of harvesting fingers tapering from the point to the base and arranged in, what I term, a curved profile so as to force the bolls and cotton back toward the surface of the drum where the space therebetween is not so large, thereby holding the bolls and cotton, pulling same from the stalks and carrying them up and around to the conveyor; to provide, through the use of a large drum a slow upward motion of the harvesting fingers so as to gently approach and handle the cotton to be harvested; to provide a minimum of wearing parts; to eliminate all timing and technical adjustments; to eliminate catching, pulling and cutting of limbs and stalk of the cotton plant; to insure gathering a greater proportion of the cotton than has heretofore been machine harvested; to provide a harvester adaptable to gather the cotton from both high and low stalks; and to provide the various other advantages and results made evident in the following specification.

We choose to term our machine a cotton harvester rather than a cotton picker, the distinction being that pickers are supposed to remove the fiber and leave the empty burr, while our conception is devised to gather the cotton and the burr together, leaving the separation thereof to be performed at the gin as is done with hand snapped cotton.

In accomplishing the objects of our invention we mount a carrying frame on three wheels, one of which, located at the extreme end of said frame, acts as a guide wheel, and is controlled by means of a connected steering lever. The two other wheels are positioned one each side of the frame, forward the center of the load. One of these side wheels, preferably the right, is utilized as a bull or power wheel, and is fitted with a sprocket which with the chain attached furnishes power for moving the drum, brush, conveyors and elevator, hereinafter referred to. The drum, geared to revolve in a direction opposite to the motion of the bull or power wheel, is mounted at the forward end of the frame. This drum, large in circumference, may be of any desired width for the purpose of covering one or more rows of cotton, and is provided with a series of fingers or teeth suitably spaced to engage and pick the bolls of cotton from the plants as the drum revolves, preferably at about twenty revolutions a minute. The distance of the drum from the ground is regulated by a hand lever positioned at the driver's seat. As the drum revolves, the upward and circular movement causes the fingers thereon to lift the bolls of open cotton from the stalks with which it contacts. The fingers are so spaced on the drum that before one set have finished another lower set comes into operation. The limbs of the stalks slip through the fingers as they revolve, the bolls falling back close to the drum, are separated from the limbs, and lifted upward following the surface of the drum in its rotary motion to a point, where they fall to the first of two conveyors, positioned nearly horizontally adjacent the rear side of the drum. This first conveyor also powered from the bull wheel carries the cotton to a second sloping conveyor which is adjustable to the height of the vehicle into which the cotton is to be loaded. A brush of long fiber, extends the width of the drum over the end of the horizontal conveyor and is geared to the bull wheel so as to separate in a direction opposite that of the drum and at a greater speed. The fiber of this brush reaches into the fingers on the drum and removes the cotton therefrom as they pass.

The harvester is powered by horses or tractor supplied in the rear of the harvesting drum, thus avoiding injury to the cotton in the harvesting line.

Figure 2:
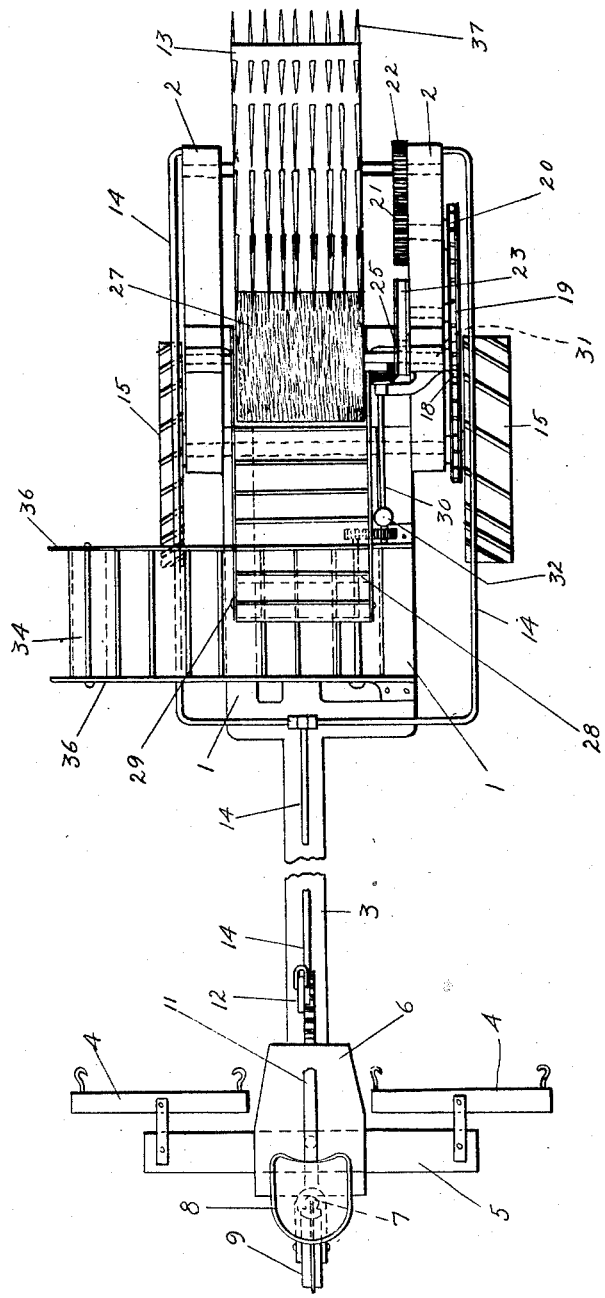
Figure 3:
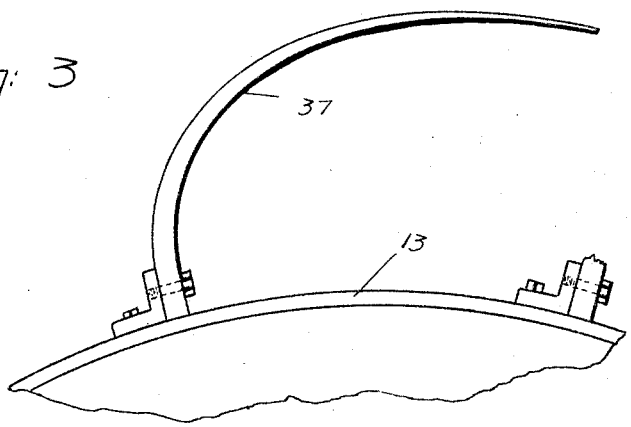
Figure 4:
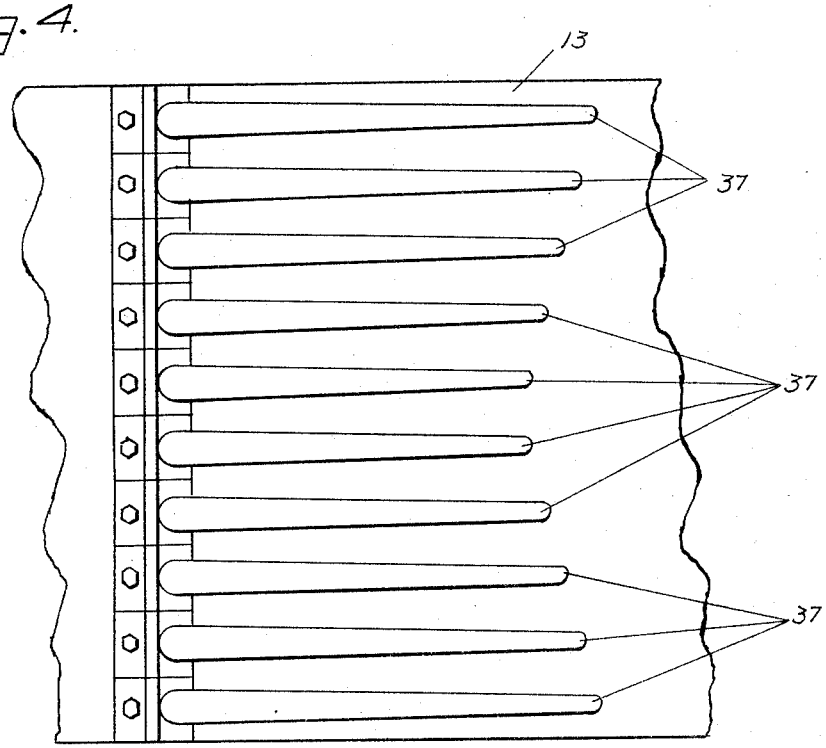

Referring to the accompanying drawings which form a part of this specification and in which similar numerals of reference refer to similar parts throughout the various views, Figure 1 is a side elevation of our machine. Figure 2 is a top view looking down onto the machine. Figure 3 shows a detail side view of the gathering fingers positioned on the drum hereinafter referred to; and Figure 4 is a detail plan view of the gathering fingers.

Referring again to the drawings, 1 shows the frame on which our machine is carried. 2 shows the frame extension. 3 shows that portion of the frame intermediate the forward and rear wheels on the sides of which are placed the power means, horses or tractor. 4 shows the whiffle trees to which the power is attached. 5 shows the rear cross beam of the frame above which is secured the driver's platform 6. 7 shows the seat post. 8 shows the operator's seat. 9 shows the rear or steering wheel, mounted on the forks 10. 11 shows the steering lever. 12 shows the harvesting drum lever connected with the drum 13 by the rod 14 and by means of which the drum 13 is raised or lowered at the will of the operator. 15 shows the forward wheels on which our machine is mounted, the right one of which is fitted at its hub with the sprocket 16 on which is mounted the chain 17 operating the sprockets 18, 19 and 20, the last of which is secured to the first of and operates the spin gears 21 and 22, the latter being secured to the drum 13. 23 shows a pulley to which is secured the sprocket 19, and which is connected by a belt to the pulley 25, the latter being mounted on the support 26 and adaptable to revolve the brush 27 as the power is applied to the machine. The conveyor belt 28 is mounted on the sprockets 18 and 29. The shaft 30 is geared at its forward end to the shaft 31 (on which is mounted the sprocket 18) and through the universal joint 32 transmits its revolving motion to the roller 33. The elevator belt 34 is mounted on the rollers 33 and 35 supported by the frame 36 and is adaptable to receive and convey the cotton to accompanying wagons as harvested. Around the circumference of the drum 13 are positioned in angular rows various series of gathering fingers 37, the outer fingers being slightly forward of the inner ones, as shown in Figure 4.

In operation as the machine goes forward the wheel 15 rotates, transmitting power and movement to the chain 17, in turn rotating the gears 18—19—20—22 and 29, the drum 13, the brush 27 and the elevator belt 34. As the harvester is directed against, moves forward and contacts with, cotton plants the fingers 37 gather the bolls, cotton and burrs which are carried by the rotary motion of the drum 13 upward and around to the brush 27, which travelling at a speed greater than the drum, dislodges the bolls, cotton and burrs causing them to drop to and be carried along by the conveyor belt 28 to the elevator belt 34 on which the bolls are in turn carried to the vehicle it is desired to load.

While we have illustrated and described a preferred construction for carrying our invention into effect, this is capable of variation or modification without departing from the spirit of the invention. We therefore do not wish to be limited to the exact details of construction herein set forth but desire to avail ourselves of such variations and modifications as come within the scope of the appended claim.

Having thus described our invention we claim as new and desire to secure by Letters Patent of the United States of America:—

A cotton harvester comprising a main frame, a supporting wheel carried by said main frame, an extension frame pivoted to said main frame for vertical swinging adjustment, a rotatable toothed cotton gathering member carried by said extension frame, a sprocket wheel fixed with respect to said supporting wheel, a gear wheel fixed with respect to said gathering member, a sprocket wheel and a gear wheel fixed with respect to one another and carried by said extension frame, a chain connecting said sprocket wheels, said gear wheels being in intermeshed relation, a rotary brush carried by said extension frame for cleaning said gathering member, a drive connection between said chain and said brush, an endless conveyor extending from a point beneath said brush to a point overlying the main frame, said conveyor being inclusive of a drive shaft and a sprocket wheel fixed thereto and in direct engagement with said chain, a second conveyor, carried by said main frame, and a drive connection between said first mentioned conveyor shaft and said second conveyor.

VICTOR E. HUNTER.
FREDERICK M. ABERNATHY.
WILLIAM H. GHOLSON.